United States Patent [19]

Eisenberg

[11] 4,255,045
[45] Mar. 10, 1981

[54] REMOVABLE LIGHT BOX

[75] Inventor: Benjamin Eisenberg, Larchmont, N.Y.

[73] Assignee: Ciba-Geigy AG, Basel, Switzerland

[21] Appl. No.: 24,820

[22] Filed: Mar. 28, 1979

[51] Int. Cl.³ .............................................. G03B 27/54
[52] U.S. Cl. ....................................... 355/37; 355/70
[58] Field of Search ...................... 355/67, 70, 71, 32, 355/37

[56] References Cited

U.S. PATENT DOCUMENTS

| | | | |
|---|---|---|---|
| 3,371,575 | 3/1968 | Simmon | 355/70 |
| 3,684,371 | 8/1972 | Weisglass et al. | 355/71 |
| 3,804,513 | 4/1974 | Ogawa | 355/70 X |
| 3,831,021 | 8/1974 | Muhlogger | 355/71 X |
| 3,874,792 | 4/1975 | Turner | 355/67 |
| 4,009,383 | 2/1977 | Beier | 355/67 X |
| 4,077,716 | 3/1978 | Gandini | 355/67 |
| 4,124,292 | 11/1978 | Van Wandelen | 355/70 X |

FOREIGN PATENT DOCUMENTS 1447459 11/1964 Fed. Rep. of Germany.
2014789 3/1970 Fed. Rep. of Germany.

Primary Examiner—Richard A. Wintercorn
Attorney, Agent, or Firm—Harry Falber

[57] ABSTRACT

The lamphouse is useful for the production of prints on variable contrast material or on conventional photographic material. A first tungsten filament lamp is provided from which light passes through a first color selective waveband filter. Another tungsten filament lamp is provided from which light passes through a second color selective waveband filter.

In the lamphouse there is a removable rectangular light box. The top of the box is covered with a light diffusing and reflecting material. The bottom of the box comprises a rectangular light diffusing screen. The light box has on each of the sides adjacent to the two lamps a light entry port. In the lamphouse there are also two guide members which are parallel to the plane of the screen in the light box and on or in which the two lamps and their filters, guide mounting means and optionally lamphouse abutment means are slideably mounted.

In operation a light box is placed in the lamphouse, both lamp and filter combination are then slid in their guides so that each lamp member abuts the light guide box. The position of the light entry posts of each removable light box are so located that when each lamp member abuts the light from each lamp is spread evenly over the whole of the top of the light box.

6 Claims, 2 Drawing Figures

REMOVABLE LIGHT BOX

This invention relates particularly to the production of prints on variable-contrast photographic printing material, usually printing paper.

Variable-contrast printing papers have been known for many years and are based on the use of photographic emulsion, or a combination or mixture of emulsions, which react differently to coloured printing light in the sense of yielding from a standard negative original prints of varying contrast according to the colour of the printing light used.

Thus for example as described in British patent specification No. 494088, one such material comprises two gelatino silver halide emulsions, one of which is designed to afford images of high contrast while the other is designed to afford images of low contrast. The emulsions are arranged to be sensitive to light in different regions of the spectrum, for example the low-contrast emulsion may be blue-sensitive and the high-contrast emulsion may be sensitised to the green and/or red regions of the spectrum. It then arises that accordingly as the colour of the exposing light varies, more of one and less of the other emulsion will be effectively exposed and the net contrast of the developed prints will correspondingly vary.

In other material as described in British patent specification No. 547883 all the emulsion components are of the same basic contrast but the individual components have been dye-sensitised in varying degree to green light. Such material which at the present moment is of most interest may also be used as variable contrast photographic printing paper.

The usual technique employed in the production of prints on such a material is to provide a set of colour filters of different colour transmission characteristics, whereby the colour of printing light may be adjusted.

By the appropriate selection of the filter used to control the colour of the printing light, it then arises that negatives representing a wide range of contrasts can be printed on the one type of printing paper, each yielding a print of the desired contrast characteristics.

However, the system as operated at present suffers from some disadvantages. Thus, when it is desired to make a change in the effective contrast of the paper by changing filters it also becomes necessary to modify the exposure given to the print. Since the required change in exposure varies with the degree of alteration that is being made in the contrast of a print, it is often necessary to expose several test strips before the final print can be made with assurance of a satisfactory result. Further, for convenience in operation, the contrast changing filters are often placed in the printing beam below the enlarger lens, thereby impairing to some extent the quality of the projected image. (An alternative position for the filters is above the condenser, in the enlarger head, but this gives rise to considerable inconvenience in practice).

A photographic system which may also be used to produce prints of variable contrast consists of conventional photographic printing material of fixed contrast, preferably medium contrast, and a transparency the image of which comprises a dye the optical absorption of which is selective within the wavelength band to which the printing material is sensitive. Thus, for example, the transparency may comprise an image in varying densities of a yellow dye which absorbs violet light heavily but transmits green light relatively freely. If a print be made from such a transparency using only violet light, a print of high contrast will be produced. If the print be made using blue light, a print of lower contrast will result. Intermediate contrast will result from the use of appropriate mixtures of violet and blue light.

In British Pat. No. 1,539,468 there was described an enlarger head for printing onto variable contrast paper using a black and white transparency by use of which the optimum time remains unchanged throughout the whole of the available contrast range of the print material. This enlarger may also be used for printing conventional print material using a monochrome transparency.

In British Pat. No. 1,539,468 the enlarger head comprised a lamphouse which comprises at least one tungsten filament lamp from which light passes through a first colour-selective filter passing light in one of two mutually exclusive wavebands and one tungsten filament lamp from which light passes through a second colour-selective filter passing light in the other of the two mutually exclusive wavebands, a diffusing screen placed to pass the filtered light out of the lamphouse and through the transparency, there being connected to the lamphouse electrical means actuated by a single manual control to adjust the currents in the lamp filaments so that the actinic intensities of light passing said first and second colour filters are adjusted in complementary manner.

Such a lamphouse has been found to be of great practical use because of its ease of operation. However, lamphouses of the apparatus described and illustrated in British Pat. No. 1,539,468 could only be used with one size of negative, the size of the negative depending on the size of the diffuser. We have now discovered a method of modifying the enlarger head described in British Pat. No. 1,539,468 to enable it to be used with a variety of sizes of negative and also to provide a lightbox in the enlarger head by use of which light from each lamp is well mixed in the light box and which provides even illumination of the negative.

According to the present invention there is provided a lamphouse for use in the production of prints of variable contrast material or on conventional photographic material which comprises a tungsten filament lamp from which light passes through a first colour-selective filter passing light in one of two mutually exclusive wavebands and a tungsten filament lamp from which light passes through a second colour-selective filter passing light in the other of the two mutually exclusive wavebands, there being present in the lamphouse a removable light box of substantially rectangular shape, the light box having on each of the two sides adjacent to the two lamps a light entry port, the two lamps being so located in the lamphouse that they pass upwardly inclined beams of light into the light box, the portion of the light box above the light beam entry ports and the ceiling thereof being covered with light reflecting and light diffusing material, the remainder of the walls of the light box being of light reflecting mirror material, the bottom of the box comprising a rectangular light diffusing screen, there being present in the lamphouse two guide members which are parallel to the plane of the screen in the light box and on or in which the two lamp members, each of which comprises one of the said lamps together with one colour-selective filter, guide mounting means and optionally lamphouse abutment means, are slideably mounted so that in operation with a light box is placed in the lamphouse both lamp members can be slid in or on their respective guides so that each lamp member abuts the said light guide box.

The light entering the light box must, because it is upwardly inclined, strike first a light diffusing surface. The diffusing surface behaves as a secondary light source and, by inter-reflection of light to and from other parts of the diffusing surface, it provides good mixing of light contributed by the two lamps.

Whilst this inter-reflection is desirable from the point of view of good light mixing, from consideration of efficiency of light usage inter-reflection should be restricted. At each reflection a proportion of light is lost and so it is desirable to limit the number of reflections occurring before a typical input ray reaches the diffusing screen. Such limitation is provided by lining the light box with mirror surfaces between the light entry ports and the diffusing screen. Because the input light is inclined away from these mirrors, any ray striking such a mirror must have been reflected already from a diffuser. Moreover such a ray must already be inclined toward the diffusing screen. Hence a mirror surface is an appropriate reflector at this point because it preserves this inclination of the ray towards the diffusing screen.

In contrast, a diffuse reflector in place of the mirror would return a proportion of light in a direction away from the diffusing screen. Further reflections would be needed to return this light to the diffusing screen and such further reflections necessarily incur further loss of light.

Thus the light box used in the lamphouse of the present invention is particularly favourable to achieving a high level of light uniformly spread over the diffusing screen.

Preferably each lamp can be fastened to its respective guide.

In one embodiment each lamp is located in a slot guide which is parallel to the plane of the screen in the light box. Each lamp may be fastened to the slot in which it is located by screw means or may be held in position by magnetic means. For example each lamp may have two magnet slot supports.

In practice it is convenient to provide three removable light boxes for use in the lamphouse; one for use with 5 inch by 4 inch (12.7 by 10 cm) transparencies, the second for use with 6 by 7 cm transparencies and the third for use with 24 by 36 mm transprencies.

Preferably the inside of each removable light box is lined with glass mirrors between the light entry ports and the screen.

Preferably the light diffusing material is white expanded polystyrene.

The accompanying drawings will serve to illustrate the invention.

In both the figures the same numbers have the same signification.

Figure 1:
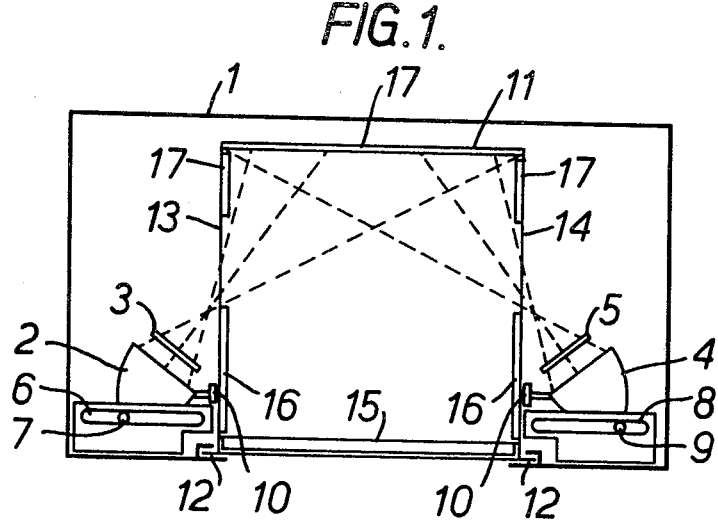
FIG. 1 is a diagrammatic cross sectional view of a lamphouse according to the present invention showing in situ one size of light box.

A lamphouse 1 comprises a tungsten halogen lamp 2 having attached thereto a yellow filter 3 and a tungsten halogen lamp 4 having attached thereto a magenta filter 5. The lamp 2 is slideably mounted in a slot 6 which is attached to the base of the lamphouse 1. The position of the lamp 2 in the slot 6 is fastened by a screw mounting 7. The lamp 4 is slideably mounted in a slot 8 and is fixed in the slot by the screw mounting 9. Each lamp has an abutment means 10.

Placed between the lamps 2 and 4 is a rectangular light box 11 which rests on flanges 12.

Facing the lamp 2 is a light entry port 13 in the side of box 11 and facing the lamp 4 is a light entry port 14 in the side of box 11. At the bottom of the box is an opal diffuser 15.

The side walls of the light box 11 are covered internally with mirrors 16 below the level of the light entry ports 13 and 14. The top of the light box and the side walls 17 above the mirrors are lined with expanded polystyrene.

Figure 2:
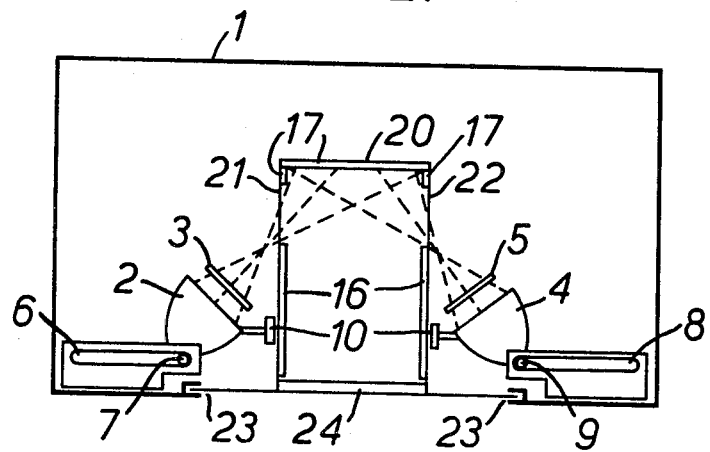
FIG. 2 is also a cross sectional side view of the same lamphouse as shown in FIG. 1 but with a different size light box therein.

FIG. 2 shows exactly the same lamphouse 1 as shown in FIG. 1 but present between the lamps 2 and 4 is a much smaller light box 20. The box 20 rests on flanges 23 which have the same perimeter as the flanges 12 on the light box 11. Light box 20 comprises two light entry ports 21 and 22 and an opal diffuser screen 24.

When light box 11 is to be removed from the lamphouse 1 the screw fastenings 7 and 9 are undone and the lamps 2 and 4 are slid towards the sides of the lamphouse 1. Light box 11 can then be slid out of the lamphouse 1 and be replaced by light box 20. When the light box 20 is in position in the lamphouse 1, lamps 2 and 4 are slid along their respective slots until the filters 3 and 5 attached to the lamps abut the side of the light box 20. The position of the light entry ports 21 and 22 in the light box 20 has been so arranged that when the lamps 2 and 4 abut the side of the light box 20 the whole of the roof of the light box 20 is evenly illuminated.

The same is true of the position of the light entry ports 13 and 14 in the light box 11.

Thus a different size transparency or negative can be evenly illuminated using the dual light systen of the lamphouse by means of the changeable light boxes. Furthermore by arranging for the two lamps to abut the side of a light box when in position it is possible to arrange for the entry ports on both light boxes to be so located that even illumination of the roof of both light boxes is possible. This ensures even illumination of the diffuser screens 15 and 24.

I claim:

1. A lamphouse for use in the production of prints on variable contrast material or on conventional photographic material which comprises a tungsten filament lamp from which light passes through a first colour-selective filter passing light in one of two mutually exclusive wavebands and a tungsten filament lamp from which light passes through a second colour-selective filter passing light in the other of the two mutually exclusive wavebands, there being present in the lamphouse a removable light box of substantially rectangular shape, the light box having on each of the two sides adjacent to the two lamps a light entry port, the two lamps being so located in the lamphouse that they pass upwardly inclined beams of light into the light box, the portion of the light box above the light beam entry ports and the ceiling thereof being covered with light reflecting and light diffusing material, the remainder of the walls of the light box being of light-reflecting mirror material, the bottom of the box comprising a rectangular light diffusing screen, there being present in the lamphouse two guide members which are parallel to the plane of the screen in the light box and on or in which the two lamp members, each of which comprises one of the said lamps together with one colour-selective filter, guide mounting means and optionally lamphouse abutment means, are slideably mounted so that in operation when a light box is placed in the lamphouse both lamp members can be slid in or on their respective guides so that each lamp member abuts the said light guide box.

2. A lamphouse according to claim 1 wherein each lamp is fastened to its respective guide.

3. A lamphouse accordin to either claim 1 or claim 2 wherein each lamp is located in a slot guide which is parallel to the plane of the screen in the light box.

4. A lamphouse according to claim 1 wherein the inside of each removable light box is lined with glass mirrors between the light entry port and the diffusing screen.

5. A lamphouse according to claim 1 wherein each removable light box is lined with white expanded polystyrene as the light reflecting and diffusing surface on the walls of each box above the light entry ports and on the ceiling.

6. A lamphouse according to claim 1 which has associated with it three removable light boxes, one for use with 12.7 by 10 cm transparencies, one for use with 6 by 7 cm transparencies and one for use with 24 by 36 mm transparencies.

* * * * *